United States Patent
Schramm et al.

(10) Patent No.: US 6,652,034 B1
(45) Date of Patent: Nov. 25, 2003

(54) UPHOLSTERY SUPPORT

(75) Inventors: Christian Schramm, Kipfenberg (DE); Heiko Petersdorff, Lenting (DE)

(73) Assignee: Audi AG (DE)

( * ) Notice: Subject to any disclaimer, the term of this patent is extended or adjusted under 35 U.S.C. 154(b) by 0 days.

(21) Appl. No.: 09/806,811

(22) PCT Filed: Oct. 1, 1999

(86) PCT No.: PCT/EP99/07288

§ 371 (c)(1),
(2), (4) Date: Jun. 13, 2001

(87) PCT Pub. No.: WO00/19865

PCT Pub. Date: Apr. 13, 2000

(30) Foreign Application Priority Data

Oct. 5, 1998 (DE) .......................... 198 45 730

(51) Int. Cl.⁷ ................................ A47C 7/02
(52) U.S. Cl. .............. 297/452.35; 297/452.29; 297/452.32; 297/DIG. 1; 5/740; 5/655.9; 5/728
(58) Field of Search ............ 297/452.35, 452.29, 297/452.32, 452.36, DIG. 1; 5/740, 655.9, 728, 731, 643; 267/141.1, 267

(56) References Cited

U.S. PATENT DOCUMENTS

| | | | |
|---|---|---|---|
| 3,363,943 A | * 1/1968 | Getz et al. ........... 267/110 |
| 3,537,752 A | * 11/1970 | Kushnarov et al. ..... 297/452.26 |
| 4,099,278 A | 7/1978 | Parisi |
| 4,568,124 A | 2/1986 | Kanai |
| 4,747,638 A | * 5/1988 | Saito ...................... 297/452.35 |
| 5,085,487 A | * 2/1992 | Weingartner et al. ..... 297/452.1 |
| 5,100,204 A | 3/1992 | Makihara et al. |
| 5,248,185 A | * 9/1993 | Weingartner et al. ... 297/452.58 |
| 5,251,963 A | * 10/1993 | Inayoshi et al. ........ 297/452.12 |
| 5,704,691 A | * 1/1998 | Olson ................... 297/452.15 |
| 6,212,720 B1 | * 4/2001 | Antinori et al. .............. 5/716 |
| 6,401,283 B2 | * 6/2002 | Thomas et al. ................ 5/740 |

FOREIGN PATENT DOCUMENTS

| DE | 9012858 | 1/1991 |
| DE | 9110383 | 7/1991 |

* cited by examiner

Primary Examiner—Peter M. Cuomo
Assistant Examiner—Enka Garrett
(74) Attorney, Agent, or Firm—Stevens, Davis, Miller & Mosher

(57) ABSTRACT

The invention relates to an upholstery support for a seat, especially for utilization in an automobile. According to the invention, an especially lightweight of vehicle seat construction is achieved in that the upholstery support is built in the form of a sandwich. Essential elements in said sandwich-type construction are a shell mold allocated to a soft upholstery and a back wall element. A shaped foam part, preferably made of hard foam, is inserted between the latter.

15 Claims, 3 Drawing Sheets

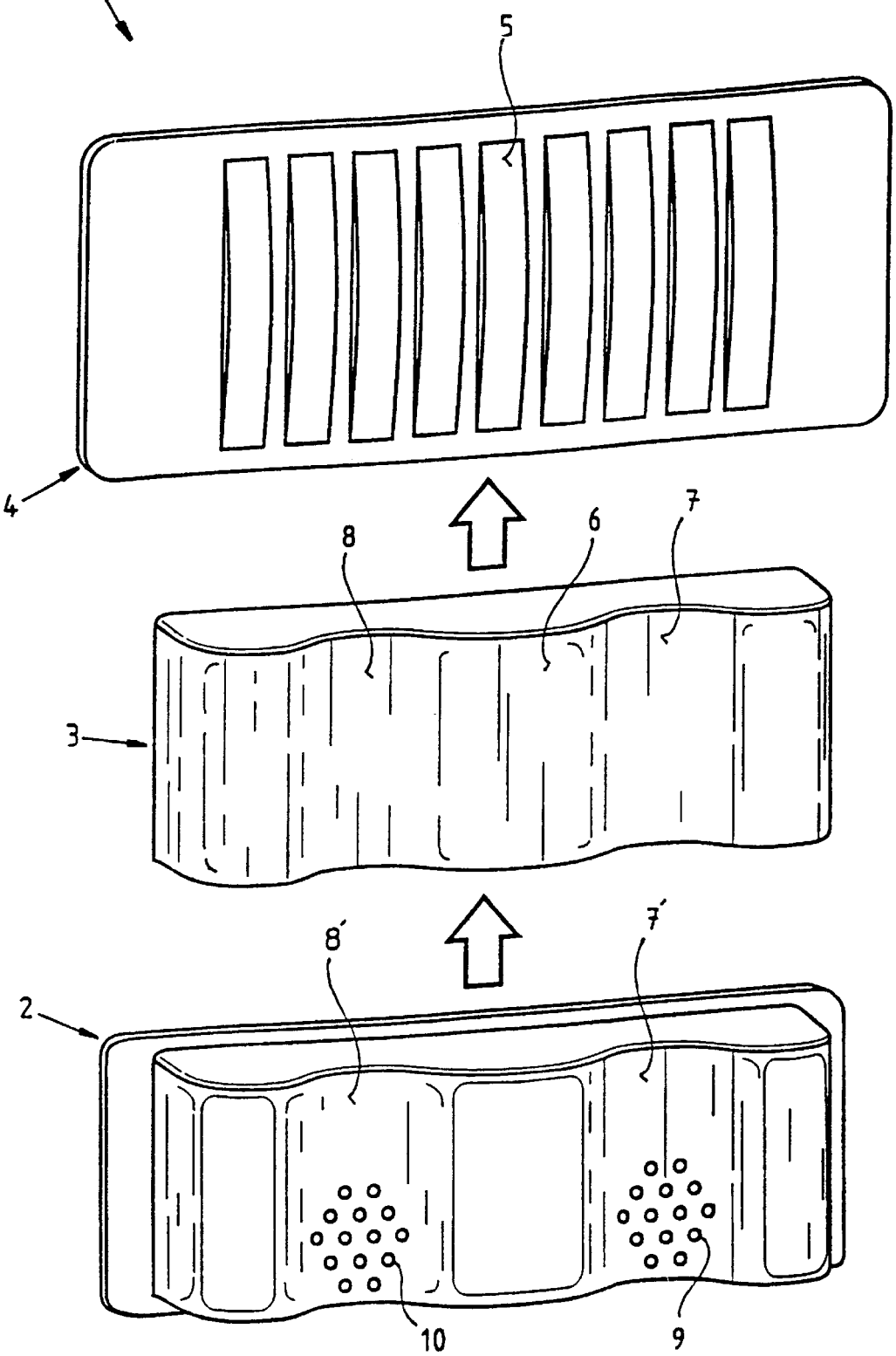

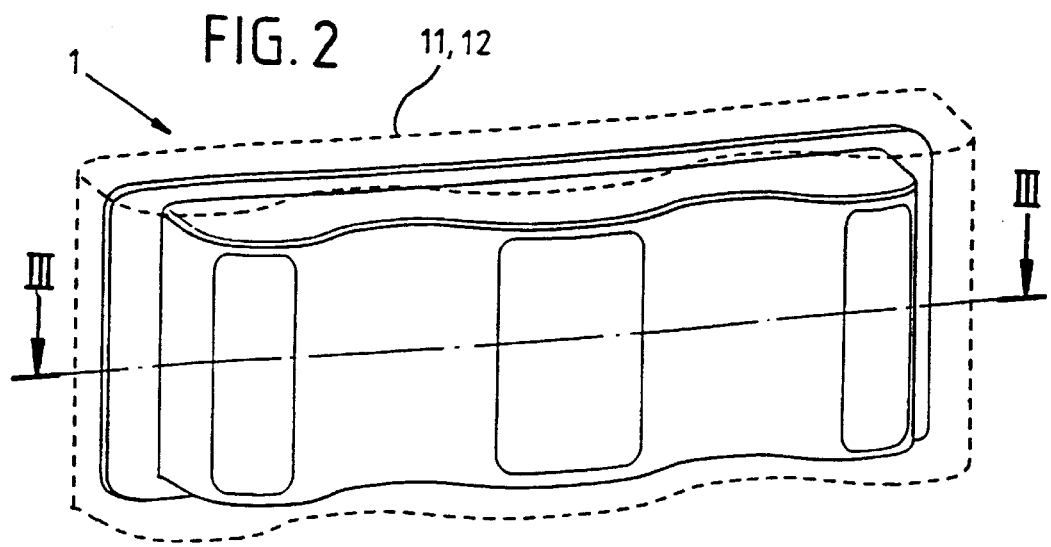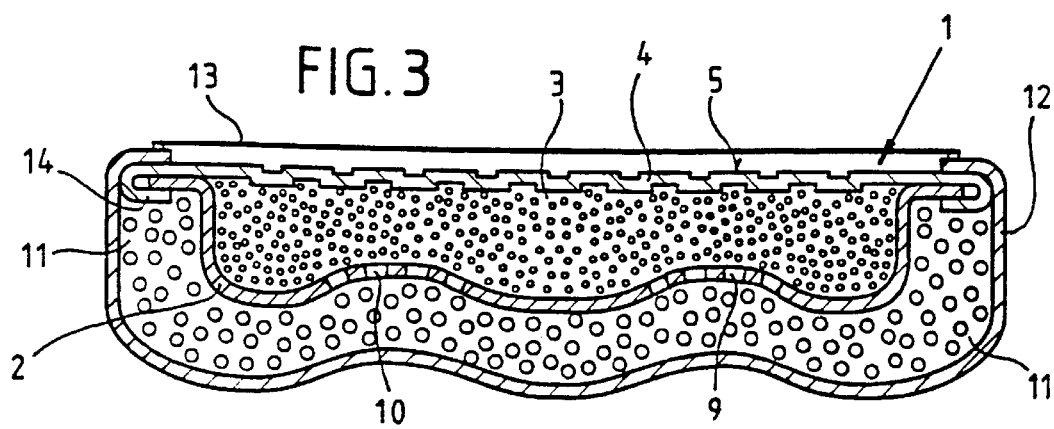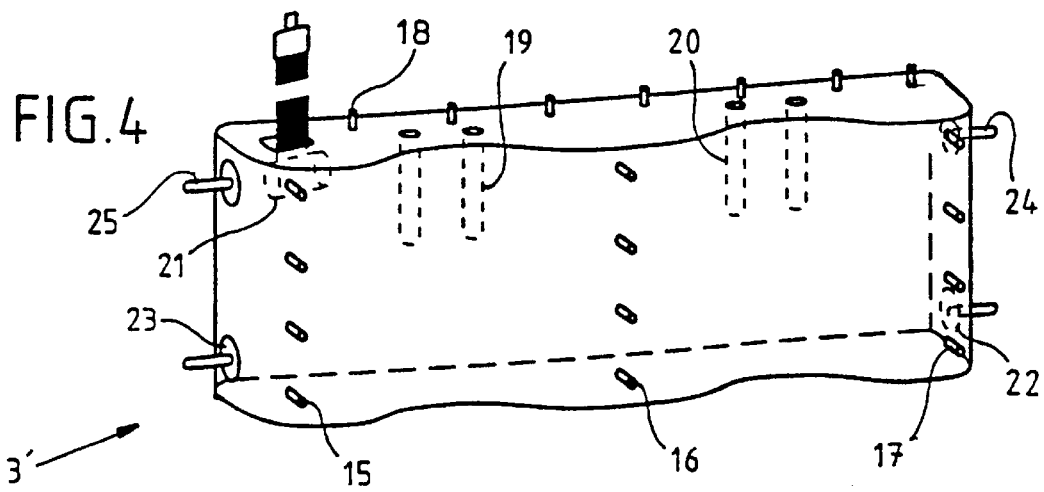

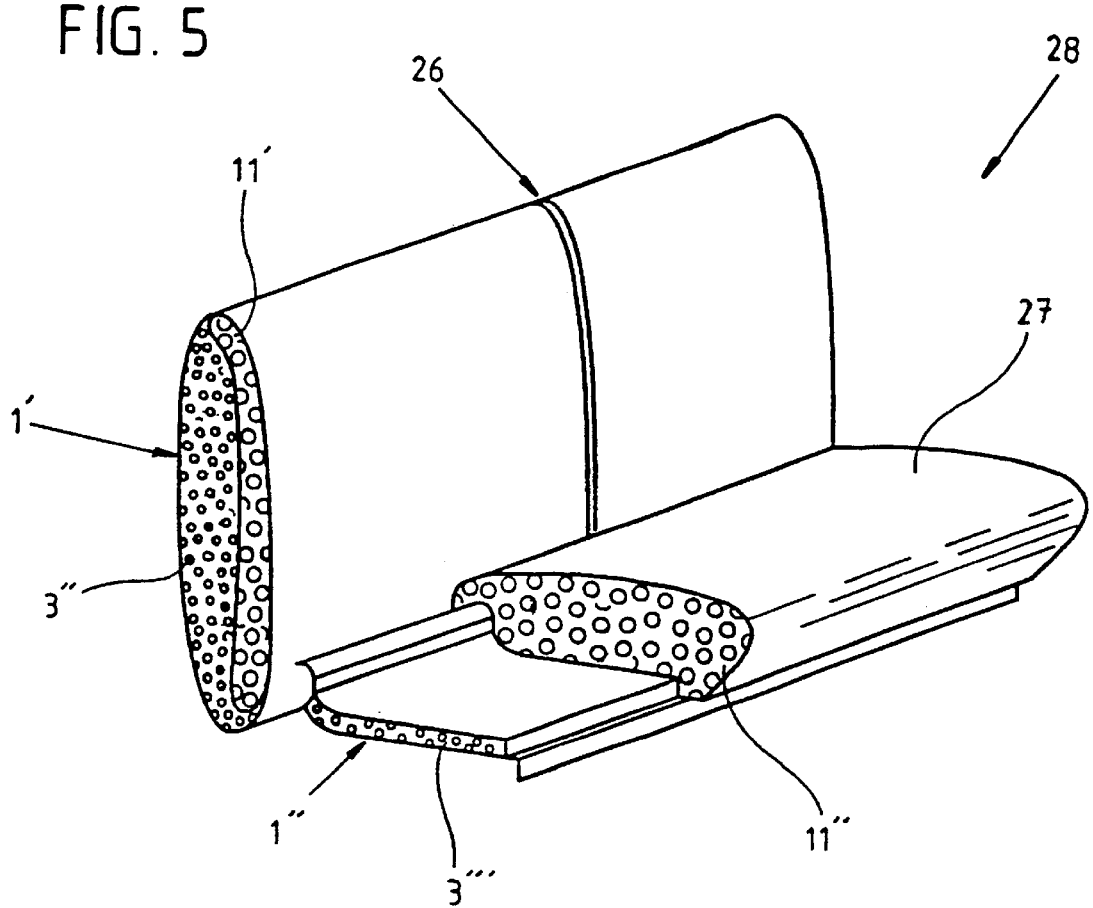

UPHOLSTERY SUPPORT

The invention relates to an upholstery support for a seat or a seating bench, especially for use in a vehicle.

An upholstery support such as this is known, for example, from DE 195 41 999-A1 (B64D11/06). The latter describes an upholstery support designed as a seat component, one which is in the form of a shell and may consist of plastic or sheet metal. The upholstery support described in this reference is preferably a component of an aircraft passenger seat. It may be inferred from this reference that an especially light construction may be obtained with the configuration described.

Another structure for a light-weight seat has been described in a lecture, "Modern fiber materials and plastics on the vehicle seat" (Kmitta, Haus der Technik, Vehicle Seat Symposium of Sep. 27/28 1994, Event Number 30-735-56-4). FIG. 15 illustrates a so-called hybrid back rest in which use is made of a metal structural component absorbing stress and torque, a component joined to a real rigidifying high-resistance foam. With respect to its construction the metal structure shown there is comparable to that of a lightweight seat as described on page 52 of *Autozeitung* [Automotive Journal] October 1997. The seat frame shown there is of more or less conventional design, and, in order to reduce weight, is made of a light metal, preferably diecast magnesium.

U.S. Pat. No. 5,100,204 and U.S. Pat. No. 4,568,124 disclose upholstery supports which are in tubular form for achievement of lightweight construction. U.S. Pat. No. 4,568,124 discloses use of the relatively unstable construction in order to obtain specific pneumatic shock absorption properties. U.S. Pat. No. 5,100,204 describes mounting of external reinforcing elements on the upholstery support in order to stabilize it.

DE-9012858.3-U1 shows an upholstery support of single-layer design onto which is molded a pouch into which an absorbing element, preferably of high-resistance foam, may be inserted to form a support for the lumbar vertebrae.

The object of the invention is development of additional means of weight reduction for upholstery supports of seats or seating benches.

This object is attained with an upholstery support if characterized by the features described in claim 1. The dependent claims relate to especially expedient developments of the invention.

It is claimed for the invention that the upholstery support is of sandwich design, in which a shell mold receiving large-area padding on one side and a rear-wall element on the other enclose a molded foam element between them. This molded foam element is preferably in the form of high-resistance foam with a so-called volume weight of 10 to 30 grams per liter. The high-resistance foam element may be designed either as an insert which is introduced between the shell mold and the rear-wall element or is injected into the cavity formed by the shell mold and the rear-wall element.

The fact that entirely conventional forming technology may be employed to produce the shell mold and the rear wall element made of light sheet metal plates, for example, is a particular advantage of the upholstery support claimed for the invention. Similarly, a suitably shaped high-resistance foam block may be conventionally manufactured and then either introduced between the sheet metal elements as a separate component or cemented to at least one of the sheet metal elements. Joining of the sheet metal elements may be effected, for example, by adhesion and/or riveting and/or welding and/or folding.

In a preferred development of the invention the shell mold, for example, is partly perforated, especially in the area of a cavity receiving the element introduced. As a result of this perforation, additional weight reduction is achieved, and also the moisture resulting from passenger perspiration can escape into the high-resistance foam block element. An air conditioning function may thus also be assigned to the upholstery support claimed for the invention.

The sandwich structure here proposed results in extremely high strength along with very low structural weight, especially for the reason that the upholstery support as a whole, that is, optionally with the exception of the marginal areas, may be designed to have very thick walls. Particular emphasis is to be placed on the fact that the space requirement for resilient foam for upholstering may be reduced by preshaping the shell mold. Hence the structural volume may be put to a distinctly different use than in the case of conventional seat structures. Application of the upholstery support claimed for the invention results in a distinctly higher proportion of structural volume for the upholstery support and a correspondingly substantially lower proportion for the resilient foam upholstery without the need for sacrificing comfort.

Of particular importance for manufacture and installation of the upholstery supports claimed for the invention are high-resistance foam parts which are designed as aggregate vehicles. For example, foam may be simultaneously injected in advance into support elements for flexible foam upholstery, headrest guides, or supports for automatic seat belt winders, and optionally metal stiffening elements. Thus, an aggregate support prepared in this manner may be positioned, completely preassembled, between the shell mold and rear wall element to produce another subassembly. The flexible foam upholstery may then be fastened to suitably prepared mountings by simple clamps or conventional bracing. Fastening of the flexible foam upholstery by means of cementing is also conceivable.

The preferred application for the upholstery supports claimed for the invention are back rests for the back seat benches of motor vehicles. Of heightened importance in this context is the fact that, for example, cargo carried behind the back rest comes up against an upholstery support in the event of sudden vehicle deceleration. One the one hand this support is relatively rigid toward these stresses, and on the other may be incorporated into the structure of the vehicle so as to absorb energy in the case of use of injected-foam link pins. Consequently, no structural changes in or additions to the body of a vehicle need be made to reduce peak loads caused by collisions on impact with loose articles carried in a vehicle. Hence what results in the aggregate is an upholstery support of high rigidity and simultaneously of great ductility. The overall structure of the support alone thus has a high energy absorption potential.

An advantageous exemplary embodiment of the invention is illustrated in the drawings, of which FIG. 1 presents an exploded view of essential elements of an upholstery support as claimed for the invention, FIG. 2 an upholstery support as a component of an upholstered back rest, FIG. 3 a view of sectional plane III/III in FIG. 2, FIG. 4 a molded foam element designed as unit support for the upholstery support claimed for the invention, FIG. 5 preferred applications for upholstery supports as claimed for the invention.

In all the figures the same reference numbers identify the same components or sections of components.

Essential components of an upholstery support designated as 1 in FIG. 1 are a shell mold 2, a shaped foam element 3, and a rear wall element 4. The latter has in this instance ribbing 5, which may optionally be dispensed with. If it is dispensed with, a simple flat metal sheet, for example, may be used as rear wall element 4.

The outline of the shaped foam element 3 is fitted to rear wall element 4 and the shell mold 2 and preferably is made of EPP or comparable high-resistance foam materials. In especially advantageous embodiments the volume weight of such materials ranges from 10 to 30 grams per liter. Particular note is to be taken that uniform distribution of the density or porosity of the foam over the entire structural volume of molded foam element 3 is not mandatory. For example, the foam strength may be lowered in a transitional area 6 between depressions 7 and 8. Specific heterogeneities in the shaped foam element 3 may be employed to ensure that maximum strength and uniform workability are achieved with a minimum amount of foam materials.

The depressions 7' and 8' are in this instance provided with hole patterns 9 and 10 produced, for example, by punching or laser cutting. The area of a depression preferably ranges from 5 to 35 percent. The diameters of the individual holes range, for example, from 20 to 50 mm.

Application of this measure results in saving of additional weight for the shell mold 2. In addition, moisture resulting from perspiration can be efficiently removed by means of a sieve structure in contact with the body of a passenger. In addition, holes may also be provided outside the depression in areas subjected to light loads. Directions of main force flow, in contrast, remain devoid of holes. Holes may also be provided in the rear wall element 4.

Preferably aluminum sheets of a thickness of 0.5 to 1.5 mm are used as base material for the rear wall element 4 and the shell mold 2. The thickness of the molded foam component 3 ranges in the center of the depressions 7 and 8 preferably from 20 to 40 mm and from 80 to 100 mm on the edges of the depressions, thus, for example in transitional area 6.

It is to be seen from the diagram in FIG. 1 that the upholstery support is in this instance more or less square in shape. However, as claimed for the invention, upholstery supports are not secured in position on this shape. Consequently, more than two adjacent depressions may be provided for buses, for example, and in addition the depressions on the edges may be positioned so that the shape of a U when viewed from above is obtained for the molded foam element 3, for example. Similarly, the upholstery supports for back rests may be designed as corner elements for camping vehicles or railroad cars.

FIGS. 2 and 3 show the upholstery supports 1 claimed for the invention together with flexible foam padding 11 covered by a textile cover 12 and together with it secured to the upholstery support 1 by conventional fastening elements 13 (for the sake of clarity only one of them is shown here). In the embodiment shown in FIG. 3 the shell mold 2 is fastened to the rear wall element 4 by a wraparound fold 14. As an alternative or addition, however, connections by means of adhesion, welding, riveting, clinching, or the like may be provided. Also conceivable is expansion of cupshaped semi-finished material reshaped by interior high-pressure reworking into a one-piece hollow body which then has the shape illustrated in FIG. 3. Analogously the geometry desired for a hollow body of plastic, for example, may be produced by blow molding such as is known in the manufacture of fuel tanks, for example.

The sketch presented in FIG. 2 shows clearly that no enlargements of any kind relative to conventional concepts are to be expected with respect to the structural volume for seats with upholstery supports 1 produced in accordance with the invention, so that the degree of comfort in passenger compartments of small vehicles in particular is not negatively affected. In addition, the configuration of the design is subject to no restrictions whatever.

The shaped foam element 3' shown in FIG. 4, in this instance designed as a so-called aggregate support, is of great importance. Designated as aggregates here are functional elements, which on the one hand are provided for fastening or mounting accessories such as safety belts and head restraints and on the other perform the function of fixing the upholstery support 1 in the vehicle's body. In addition, fastening elements for immobilizing upholstery elements such as clamps and buttons are counted among such functional elements. Indicated diagrammatically in FIG. 4, for example, are vertical rows of press fasteners 15 to 17 and a horizontal row of press fasteners 18 by which flexible foam cushions outfitted with corresponding counterparts (not shown here) are restrained. In addition, foam-filled head restraint guides 19 and 20 are provided which, if more or less the same in construction, may be taken from conventional seat mounts. Also shown here is an automatic belt winding element which is mounted on an anchor plate injected into molded foam element 3'. Analogously, dual roller systems for integrated child seats, for example, such as those disclosed in DE195 37 169 (B60N2/26), may also be introduced. Coupling of an upholstery support designed with the molded foam element 3' to the vehicle body is effected in a lower area by means of drag bearing elements 22, 23, and in the area of the upper edge of the rests by way of set pins 24, 25. Lashings to the body structure may also be made, however, by way of rigid or adjustable fittings such as those of front-seat arm structures. Back rest locks may then be dispensed with.

All functional elements may be inserted into a tool mold as an aggregate component volume and directly enveloped in foam. Hence other assembly or mounting and fastening processes may then be completely dispensed with. Also of importance in this context is that no noteworthy changes have to be made in the shell mold 2 and in the rear wall element 4. Openings for the functional elements shown in FIG. 4 can be provided by simple perforations.

Application of the upholstery supports claimed for the invention is not restricted to use of back rests as illustrated in FIGS. 1 to 4. Embodiments in the form of divided back rests 26 or use of upholstery supports as claimed for the invention in the gluteal area 27 of a vehicle seat 28, an example of which is illustrated in FIG. 5, are also conceivable. As with the other drawings, functionally identical components are identified by the same numbers, to which prime marks (') are added.

What is claimed is:

1. An upholstery support for a seat or a seating bench in a vehicle comprising a sandwich structure having a rigid shell mold associated with soft padding and a rigid rear wall element adjoining said rigid shell forming a hollow body therebetween and enclosing at least one molded foam element.

2. An upholstery support as described in claim 1, wherein the shell mold is a molded body made of light metal or plastic.

3. An upholstery support as described in claim 1, wherein the rear wall element is a molded body made of light metal or plastic.

4. An upholstery support as described in claim 1, wherein the molded foam element is designed as an inserted element made of high-resistance foam whose surfaces are shaped so as to conform to the shape of the rear wall element and the shell mold.

5. An upholstery support as described in claim 1, wherein the molded foam element is produced by injection into the hollow body.

6. An upholstery support as described in claim 5, wherein the hollow body is produced by blow molding or internal high-pressure forming.

7. An upholstery support as described in claim 1, wherein the shape of the shell mold is modified to receive gluteal padding.

8. An upholstery support as described in claim 1, wherein the shape of the shell mold is modified to receive back rest padding.

9. An upholstery support as described in claim 4 or 5, wherein the shell mold and rear wall element are shaped elements produced from sheet metal which are connected by jointing techniques.

10. An upholstery support as described in claim 9, wherein the shell mold, the rear wall element and the molded foam element are in the form of aggregate supports onto which components are fastened.

11. An upholstery support as described in claim 1, wherein the shell mold and the rear wall element have a pattern of holes.

12. An upholstery support as described in claim 1, wherein one of the shell mold and the rear wall element have a pattern of holes.

13. An upholstery support as described in claim 10, wherein the components are selected from the group consisting of a head rest support, a head rest guide, a belt winding device, a belt lock, a link lock, a link pin, a padding fastening element and a bearing element.

14. An upholstery support as described in claim 1, wherein the molded foam element is designed as an inserted element made of high-resistance foam whose surfaces are shaped so as to conform to the shape of one of the rear wall element and the shell mold.

15. An upholstery support as described in claim 9, wherein the metal is aluminum.

* * * * *